J. E. WILLETTS.
STRAINER FOR COFFEE POTS.
APPLICATION FILED MAY 11, 1909.
938,099.
Patented Oct. 26, 1909.
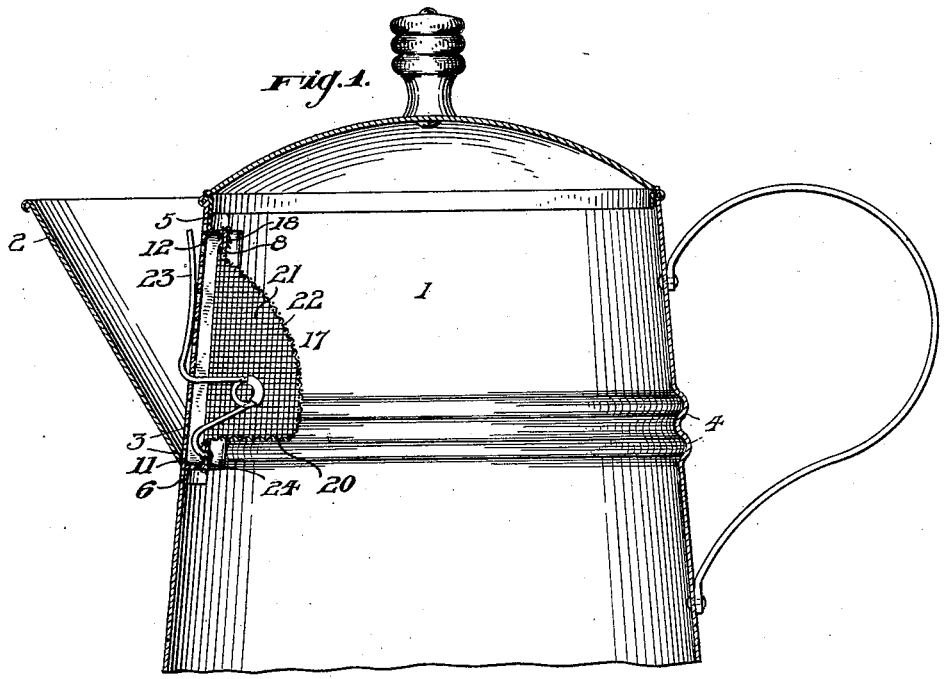
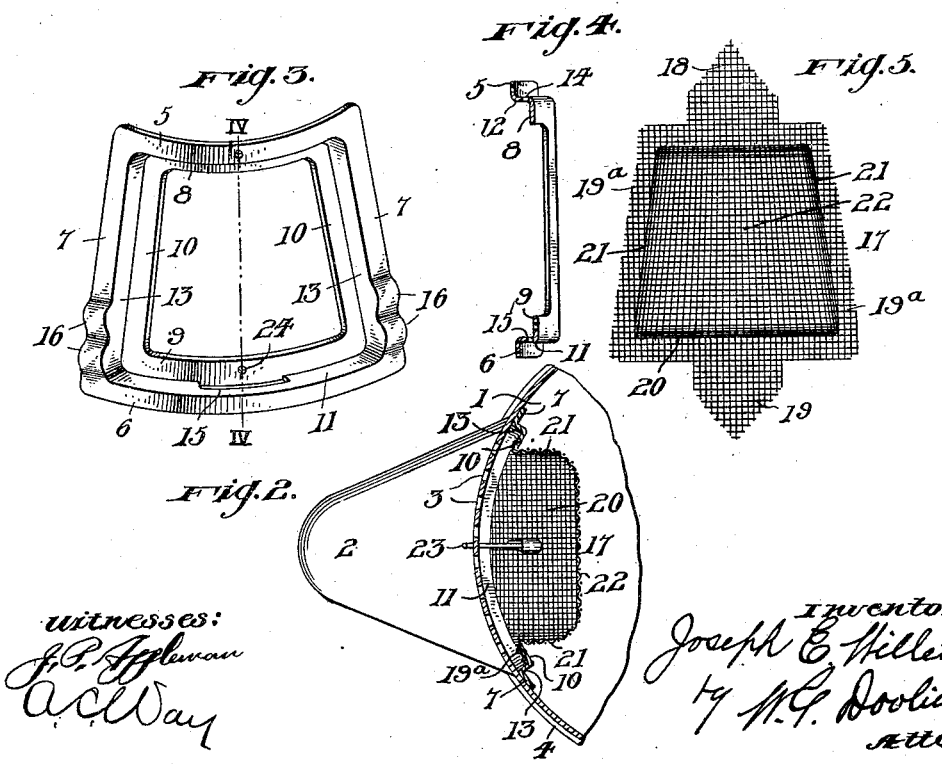
Witnesses:
Inventor
Joseph E. Willetts
by W. G. Doolittle
Attorney

UNITED STATES PATENT OFFICE.

JOSEPH E. WILLETTS, OF PITTSBURG, PENNSYLVANIA.

STRAINER FOR COFFEE-POTS.

938,099.

Specification of Letters Patent. Patented Oct. 26, 1909.

Application filed May 11, 1909. Serial No. 495,294.

*To all whom it may concern:*

Be it known that I, JOSEPH E. WILLETTS, a resident of Pittsburg, in the county of Allegheny and State of Pennsylvania, have invented certain new and useful Improvements in Strainers for Coffee-Pots, &c., of which the following is a specification.

My invention relates to improvements in strainers for coffee-pots, tea-pots, and similar receptacles, and more particularly to a new and improved detachable auxiliary strainer for receptacles of the class above set forth.

In the accompanying drawing which illustrates an application of my invention, Figure 1 is a vertical sectional view of a coffee-pot with my invention applied thereto, shown partly in elevation; Fig. 2, a part plan and a part sectional view; Fig. 3, a perspective view of the supporting-frame of the strainer; Fig. 4, a detail sectional view taken on line 4—4 of Fig. 3; and Fig. 5 a plan view of the screen or strainer proper.

As illustrated, 1 designates a coffee-pot provided with the usual spout 2 and having its wall perforated at the base of the spout as shown at 3. In the example shown, the pot is formed with corrugations 4, extending entirely around the body of the pot, but it is of course understood that the pot *per se* is not my invention.

My improved strainer may be applied to and used in connection with any style of coffee or tea-pot or similar receptacle having a perforated wall located adjacent to the spout.

The strainer as illustrated and as preferred comprises a supporting-frame structure adapted to fit over the perforations 3 and is made to correspond with the contour of the interior surface of the wall of the receptacle, adjacent to the base of the spout. As shown the support for the strainer proper comprises an integral metallic structure consisting of an outer frame formed with an upper contacting member or surface 5, a lower member 6, and side contacting members 7, all adapted when the strainer is applied to the receptacle to fit closely to the wall of the receptacle. Located back of the contacting members 5, 6, and 7 and corresponding in contour therewith is an inner or supplemental frame consisting of an upper member 8, a lower member 9, and side members 10. The corresponding members of the outer or main frame and the inner or supplemental frame are respectively connected by means of members 11, 12 and 13. Member 12 is formed with an opening or slit 14 and member 11 with a similar opening 15, each adapted to receive a projecting portion of the wire-gauze constituting the strainer proper.

When corrugations, such for example as 3 on the pot shown, are employed, it is necessary, in order to have the frame fit closely to the wall thereof, to provide corresponding corrugations 16 on the side contacting members 7.

The bulging or swelled strainer proper or screen 17, preferably made of wire-gauze, is attached to the supporting-frame by having the projecting portions 18 and 19 respectively passed through the openings 14 and 15 and then bent over the members 8 and 9 of the inner frame.

The strainer-proper is formed with a marginal rim or edges 19ª which are bent over against and lie in close contact with the top, bottom, and side members of the inner frame. The screen or strainer proper extends or bulges inwardly from its supporting-frame and comprises a substantially flat horizontal lower portion 20, slightly inclined and substantially flat sides 21 and a slightly tapering and curved front 22.

By making the strainer-proper of the form shown, I provide a construction by which the coffee-grounds, tea-leaves, etc. will not clog the strainer and prevent a free outlet of the liquid. Thus, in the form shown, when the pot is tilted in the operation of pouring its contents, the coffee-grounds, or tea-leaves, or a portion of the same will move into contact with the strainer and will bank up against the horizontal portion 20, thus leaving considerable space on the sides 21 and all of the curved front uncovered or unobstructed to a free passage of the liquid contents from the receptacle into the spout.

The supporting-frame structure together with the strainer-proper is detachably secured to the receptacle by means of a spring-attaching-member 23. Member 23 is secured to the frame at one end only and in the form illustrated, it is attached to the lower-member 9 by passing its end through an opening 24 therein and soldering it to said member, as particularly shown by Fig. 1. The said spring-attaching-member extends upwardly and inwardly from member 9 and then outwardly with its free end adapted to be inserted through one of the perforations 3 of the receptacle.

The free outer portion of the spring-member bears tightly against the outer surface of the perforated portion of the wall of the receptacle and said member is of such construction that the outer or contacting frame will be drawn into close connection with the interior surface of the wall.

What I claim is:

1. A detachable strainer for coffee pots and like receptacles, comprising a supporting-frame shaped to conform to the interior surface of the receptacle, a strainer-proper secured to the frame, and a spring attaching-member secured at one end to the lower member of the frame, said spring attaching-member projecting inwardly into the strainer-proper and then outwardly therefrom and having a free end adapted to be passed upwardly through a perforation in the wall of the receptacle.

2. A detachable strainer for receptacles of the class described, comprising a supporting-frame, a bulging or swelled strainer-proper or wire-gauze secured to the supporting-frame and having a horizontal portion, slightly inclined sides and a curved front, and a spring attaching-member secured at one end to the frame, said spring attaching-member projecting inwardly into the strainer-proper and then outwardly therefrom and having a free end adapted to be passed upwardly through a perforation in the wall of the receptacle.

3. A detachable strainer for receptacles of the class described, comprising a supporting-frame, a bulging or swelled strainer-proper secured to the frame, and a bent spring secured at one end to the lower part of the frame, said spring projecting inwardly into the strainer-proper and then outwardly therefrom.

4. A detachable strainer for receptacles of the class described, comprising a supporting-frame structure having an outer contacting frame and an inner frame, a bulged or swelled strainer-proper having a marginal rim pressed against the inner frame and secured thereto, and a bent spring attaching-member.

5. A detachable strainer for receptacles of the class described, comprising a supporting-frame structure having an outer contacting frame and an inner frame, a bulging strainer-proper having a marginal rim in contact with the inner frame, said structure formed with openings, projections on the strainer-proper passed through the openings, and a spring attaching-member.

In testimony whereof I affix my signature in presence of two witnesses.

JOSEPH E. WILLETTS.

Witnesses:
A. C. WAY,
W. G. DOOLITTLE.